US008408342B2

(12) United States Patent
Wang et al.

(10) Patent No.: US 8,408,342 B2
(45) Date of Patent: Apr. 2, 2013

(54) HYBRID POWER DRIVING SYSTEM AND DRIVING METHOD THEREOF

(75) Inventors: Chuanfu Wang, Shenzhen (CN); Hongbin Luo, Shenzhen (CN); Wei Chen, Shenzhen (CN); Yi Ren, Shenzhen (CN); Xiaohua Tang, Shenzhen (CN); Haibin Lan, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 373 days.

(21) Appl. No.: 12/739,312

(22) PCT Filed: Oct. 22, 2008

(86) PCT No.: PCT/CN2008/072783
§ 371 (c)(1),
(2), (4) Date: Jun. 14, 2010

(87) PCT Pub. No.: WO2009/056042
PCT Pub. Date: May 7, 2009

(65) Prior Publication Data
US 2010/0320016 A1 Dec. 23, 2010

(30) Foreign Application Priority Data

Oct. 22, 2007 (CN) .......................... 2007 1 0163425
Nov. 30, 2007 (CN) .......................... 2007 1 0187782

(51) Int. Cl.
*B60K 6/20* (2007.10)
(52) U.S. Cl. ......... 180/65.265; 477/3; 477/5; 180/65.21
(58) Field of Classification Search ............... 180/65.21, 180/65.225, 65.25, 65.265; 477/2, 3, 5, 6
See application file for complete search history.

(56) References Cited

U.S. PATENT DOCUMENTS

| 6,341,541 | B1 * | 1/2002 | Sakamoto et al. | ........... 74/665 A |
| 6,499,370 | B2 * | 12/2002 | Bowen | ............................. 74/330 |
| 6,502,652 | B2 * | 1/2003 | Rogg | ......................... 180/65.21 |
| 6,558,283 | B1 * | 5/2003 | Schnelle | ........................... 475/5 |
| 6,632,155 | B1 * | 10/2003 | Hohn | ................................ 477/3 |
| 6,634,247 | B2 * | 10/2003 | Pels et al. | ........................ 74/329 |

(Continued)

*Primary Examiner* — Katy M Ebner
(74) *Attorney, Agent, or Firm* — Morgan, Lewis & Bockius LLP (57) ABSTRACT

The present invention discloses a hybrid power driving system, comprising: an engine, a clutch, a first shaft, a second shaft disposed parallel to the first shaft, a motor, an energy storage device, and an output gear. The engine may be connected with the first shaft via the clutch. The motor is connected with the second shaft directly or indirectly, and is electrically connected with the energy storage device. The first shaft has a first gear, a second gear and a first synchronizer, in which the first gear and the second gear are mounted on the first shaft via bearings respectively, and the first synchronizer is selectively engaged with the first gear or the second gear. The second shaft may have a third gear, a fourth gear and a second synchronizer, in which the third gear may be mounted on the second shaft via a bearing. The fourth gear may be fixed to the second shaft. And the second synchronizer may be selectively engaged with the third gear or the fourth gear. The first gear may be engaged with the third gear, the second gear may be engaged with the fourth gear. And the third gear may be engaged with an output gear. The present invention also discloses a driving method of a hybrid power driving system. Through the first synchronizer and the second synchronizer selectively engaging with corresponding gears, a plurality of operating modes can be realized. And the structure is simple and compact.

17 Claims, 7 Drawing Sheets

U.S. PATENT DOCUMENTS

| | | | |
|---|---|---|---|
| 6,634,986 B2* | 10/2003 | Kima | 477/107 |
| 6,640,917 B2* | 11/2003 | Maruyama | 180/65.6 |
| 6,835,160 B2* | 12/2004 | Kitano et al. | 477/5 |
| 6,849,026 B2* | 2/2005 | Sakamoto et al. | 477/5 |
| 6,878,093 B2* | 4/2005 | Fukushima et al. | 477/3 |
| 6,881,169 B2* | 4/2005 | Katakura | 477/3 |
| 6,890,284 B2* | 5/2005 | Sakamoto et al. | 477/109 |
| 6,976,934 B2* | 12/2005 | Komeda et al. | 477/5 |
| 7,108,087 B2* | 9/2006 | Imai | 180/65.23 |
| 7,150,698 B2* | 12/2006 | Sakamoto et al. | 477/5 |
| 7,353,895 B2* | 4/2008 | Bitsche et al. | 180/65.25 |
| 7,604,565 B2* | 10/2009 | Lee et al. | 477/3 |
| 7,625,311 B2* | 12/2009 | Dilzer | 477/5 |
| 7,632,209 B2* | 12/2009 | Sakamoto et al. | 477/5 |
| 7,670,256 B2* | 3/2010 | Winkelmann et al. | 477/5 |
| 2001/0050190 A1* | 12/2001 | Takenaka | 180/65.2 |
| 2004/0079565 A1* | 4/2004 | Bitsche et al. | 180/65.2 |
| 2008/0009379 A1* | 1/2008 | Steinwender | 475/5 |
| 2010/0311540 A1* | 12/2010 | Hellenbroich | 477/5 |

* cited by examiner

HYBRID POWER DRIVING SYSTEM AND DRIVING METHOD THEREOF

TECHNICAL FIELD

The present disclosure relates to a hybrid power driving system and a driving method thereof.

BACKGROUND

A hybrid vehicle adopts two different power sources at the same time, and according to different connection manners of a power system, there are mainly three types of structure: series, parallel, parallel and series.

The characteristic of the series structure is to combine the output power by electricity; the engine directly drives the generator to charge the energy storage device and the motor; the motor is used to drive the wheels. The characteristic of the parallel structure is to combine output power by mechanical energy; the engine is connected with the drive shaft; the motor may operate as the motor and the generator simultaneously to balance the load of the engine. The driving modes of the series structure and parallel structure are respectively single, and can not fully exert the advantage of the hybrid power driving system.

Currently, the hybrid power driving system used in prior art is usually the series and parallel type.

For one of the current series and parallel mode, power is distributed to every power unit by a planet gear mechanism. In this mechanism, the engine is connected with a planet carrier; a part of the mechanical energy of the engine is transferred into electricity by a first motor to provide electricity to a second motor or to charge the energy storage device; another part of the mechanical energy directly acts on a gear ring. Meanwhile, the second motor is connected with the gear ring to provide a part of power and torque.

For another series and parallel mode in prior art, power is distributed to every power unit by a clutch, such as those disclosed in U.S. Pat. No. 6,209,672B1. In this structure, the engine is connected to a first motor; the first motor and the second motor are connected through the clutch; the vehicle power is transferred to wheels through an output shaft of the second motor. By controlling the engage and disengage of the clutch, a plurality of running modes are achieved.

In above mentioned two series and parallel modes, generally there are two motors; sometimes a transmission is needed. For the first mode, the planet gear mechanism is needed. So the structure is complicated occupying more space, which counts against the vehicle layout and reduction of vehicle weight.

For another series and parallel mode in prior art, power is distributed to each power unit by a clutch and a transmission.

For example, US Patent Application No. 2006/0254837A1 discloses a hybrid power driving system. The engine is connected to the first input shaft of the transmission by a clutch; a motor is connected to the second input shaft of the transmission. The power of the engine and/or the motor is transferred to the wheels through an output shaft of the transmission. The first input shaft and the second input shaft may be two terminals of a common main shaft which penetrates through the transmission, or may be two separate shafts which are jointed together. When the clutch is engaged, the engine can drive the vehicle separately (the engine may also used to control the motor to generate electricity at this time); or the engine and the motor are connected in paralleled to drive the vehicle. When the clutch is disengaged, the motor drives the vehicle separately. In this solution, the power distribution of each power unit is mainly utilized by the clutch. The transmission functions as a traditional role of speed variation. Thus, the driving mode of this driving system is relatively simple. In addition, the transmission is too huge which is disadvantageous for reducing the total vehicle weight.

In addition, U.S. Pat. Nos. 5,337,848 and 6,019,698 also disclose a similar structure, that is, a clutch is configured between an engine and a transmission. Different driving modes of the vehicle are realized by engagement and the disengagement of the clutch. Moreover, the power of the engine and the motor can be coupled by the transmission and then transferred to wheels. There is the same problem in this structure. That is, the driving mode is relatively simple, and the transmission is too huge which is disadvantageous for reducing the total vehicle weight.

SUMMARY

Objectives of the present disclosure relate to provide a hybrid power driving system and a driving method thereof. The driving system has a simple structure, occupy less space and has a plurality of driving modes. The driving method is simple for controlling, which can switch among different driving modes conveniently.

According to an aspect of the present disclosure, a hybrid power driving system may be provided, comprising: an engine, a clutch, a first shaft, a second shaft disposed parallel to the first shaft, a motor, an energy storage device and an output gear. The engine may be connected with the first shaft via the clutch. The motor may be connected with the second shaft directly or indirectly, and may be electrically connected with the energy storage device. The first shaft may have a first gear, a second gear and a first synchronizer, in which the first gear and the second gear may be mounted on the first shaft via bearings respectively. And the first synchronizer may be selectively engaged with the first gear or the second gear. The second shaft may have a third gear, a fourth gear and a second synchronizer, in which the third gear may be mounted on the second shaft via a bearing. The fourth gear may be fixed to the second shaft, and the second synchronizer may be selectively engaged with the third gear or the fourth gear. The first gear may be engaged with the third gear, the second gear may be engaged with the fourth gear, and the third gear may be engaged with an output gear.

According to another aspect of the present disclosure, a hybrid power driving system may be provided. The driving system may comprise an engine, a clutch, a first shaft, a second shaft disposed parallel to the first shaft, a motor, an energy storage device, and an output gear. The engine may be connected with the first shaft via the clutch. The motor may be connected with the second shaft directly or indirectly, and may be electrically connected with the energy storage device. The first shaft may have a first gear, a second gear and a first synchronizer, in which the first gear and the second gear may be mounted on the first shaft via bearings respectively, and the first synchronizer may be selectively engaged with the first gear or the second gear. The second shaft may have a third gear, a fourth gear, a fifth gear and a second synchronizer, in which the third gear and the fourth gear may be fixed on the second shaft. The fifth gear may be mounted on the second shaft via a bearing, and the synchronizer may be selectively engaged with the fifth gear. The first gear may be engaged with the third gear, the second gear may be engaged with the fourth gear, and the fifth gear may be engaged with the output gear.

According to still another aspect of the present disclosure, a driving method of a hybrid power driving system may be provided. The driving method may comprise the following steps: providing an engine, a clutch, a first shaft, a second shaft disposed parallel to the first shaft, a motor, an energy storage device; and an output gear; the engine may be connected with the first shaft via the clutch, when the clutch may be engaged, the engine outputs power to the first shaft; the motor may be connected with the second shaft directly or indirectly, and may be electrically connected with the energy storage device, such that the motor outputs power to the second shaft by receiving electricity from the energy storage device, or the motor generates electricity and stores the electricity into the energy storage device by receiving power from the second shaft; the first shaft may be provided with a first gear, a second gear and a first synchronizer, in which the first gear and the second gear may be mounted on the first shaft via bearings respectively, and the first synchronizer may be selectively engaged with the first gear or the second gear; the second shaft may be provided with a third gear, a fourth gear and a second synchronizer, in which the third gear may be mounted on the second shaft via a bearing, the fourth gear may be fixed on the second shaft, and the synchronizer may be selectively engaged with the third gear or the fourth gear; the first gear may be engaged with the third gear, the second gear may be engaged with the fourth gear, and the third gear may be engaged with the output gear; the output gear may be used to output power from the engine and/or the motor to wheels, or feed power from the wheels back to the motor, thus causing the motor to generate electricity and store to the generated electricity into the energy storage device.

According to still yet another aspect of the present disclosure, a driving method of a hybrid power driving system may be provided, which may comprise: providing an engine, a clutch, a first shaft, a second shaft disposed parallel to the first shaft, a motor, an energy storage device, and an output gear, the engine may be connected with the first shaft via the clutch, when the clutch may be engaged, the engine outputs power to the first shaft; the motor may be connected with the second shaft directly or indirectly and electrically connected with the energy storage device, the motor outputs power to the second shaft by receiving electricity from the energy storage device, or the motor generates electricity and stores the electricity into the energy storage device by receiving power from the second shaft, the first shaft may be provided with a first gear, a second gear and a first synchronizer, in which the first gear and the second gear may be mounted on the first shaft via a bearing, and the first synchronizer may be selectively engaged with the first gear or the second gear; the second shaft may be provided with a third gear, a fourth gear, a fifth gear and a second synchronizer, in which the third gear and the fourth gear may be mounted on the second shaft via bearings respectively, the fifth gear may be mounted on the second shaft via a bearing, and the synchronizer may be selectively engaged with the fifth gear; the first gear may be engaged with the third gear, the second gear may be engaged with the fourth gear, and the fifth gear may be engaged with the output gear; the output gear may be used to output the power from the engine and/or the motor to wheels, or feed the power from the wheel back to the motor, thus causing the motor to generate electricity and store the electricity into the energy storage device.

In above embodiments, as dexterously using a structure similar to a clutch, i.e., through selectively engaging each gear via the first synchronizer and the second synchronizer, a plurality of driving modes can be realized conveniently. And the structure may be simple and compact, which may be advantage for vehicle arrangement and total weight reduction of the vehicle.

Other features and corresponding advantages of present disclosure will be described in details in the following embodiments.

BRIEF DESCRIPTION OF THE DRAWINGS

FIGS. 1 and 2 are schematic structural views of the hybrid power driving system according to embodiments of the present invention, in which FIG. 1 is a schematic structural view of the hybrid power driving system according to one embodiment of the present invention.

FIGS. 3 and 4 are schematic structural views of the hybrid power driving system according to another embodiments of the present invention, in which FIG. 3 is a schematic structural view of the hybrid power driving system according to one embodiment of the present invention, and FIG. 4 is a schematic structural view of the hybrid power driving system according to another embodiment of the present invention;

DETAILED DESCRIPTIONS OF EMBODIMENTS OF THE INVENTION

The hybrid power driving system according to embodiments of the present invention will be described in details with reference to drawings below.

Figure 1:
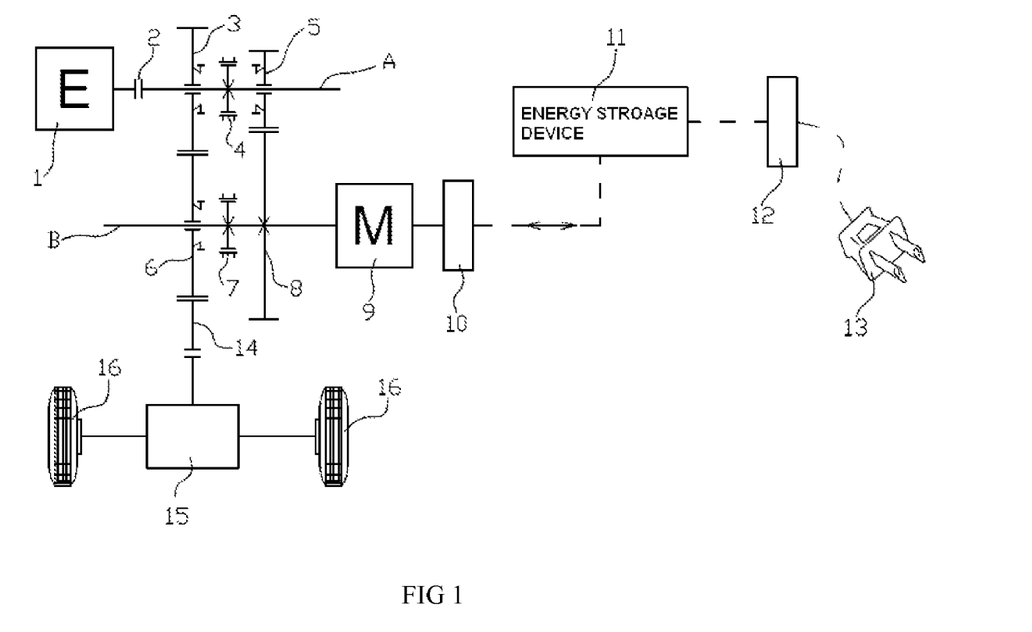
Figure 2:
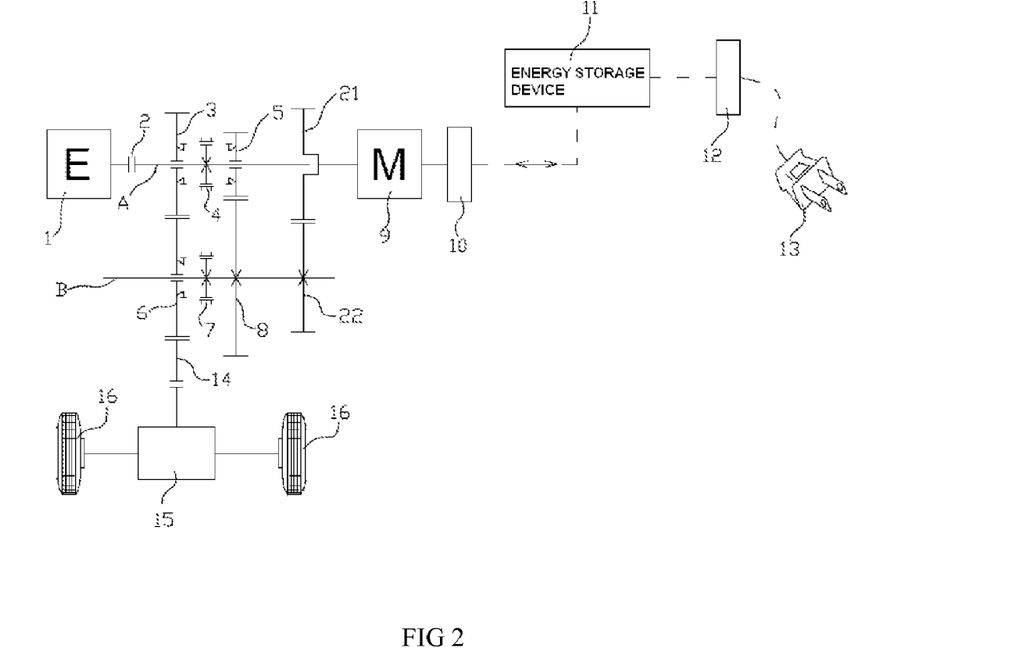
FIG. 2 is a schematic structural view of the hybrid power driving system according to another embodiment of the present invention.

As shown in FIGS. 1 and 2, in one embodiment of the present invention, a hybrid power driving system is provided, the hybrid power driving system comprises an engine 1, a clutch 2, a first shaft A, a second shaft B disposed parallel to the first shaft A, a motor 9, an energy storage device 11, and an output gear 14. The engine 1 is connected with the first shaft A via the clutch 2. The motor 9 is connected with the second shaft B directly or indirectly, and electrically connected with the energy storage device 11. The first shaft A has a first gear 3, a second gear 5 and a first synchronizer 4. The first gear 3 and the second gear 5 are fitted over and mounted on the first shaft A via bearings respectively, and the first synchronizer 4 is selectively engaged with the first gear 3 or the second gear 5. The second shaft B has a third gear 6, a fourth gear 8 and a second synchronizer 7. The third gear 6 is fitted over and mounted on the second shaft B via a bearing, the fourth gear 8 is mounted fixedly onto the second shaft B, and the second synchronizer 7 is selectively engaged with the third gear 6 or the fourth gear 8. The first gear 3 is engaged with the third gear 6, the second gear 5 is engaged with the fourth gear 8, and the third gear 6 is engaged with an output gear 14.

In the embodiments of the present invention, similar to the prior art unless indicated particularly, connections of the engine and the other components generally refer to the mechanical connections between the output shaft of the engine and the components so as to input and/or output power via the components, and connections of the motor and the other components generally refer to the mechanical connections between the output shaft of the more and the components so as to input and/or output power via the components.

In addition, the connection between two components can be realized by various means, for example, two shafts can be coupled via a known coupler or a transmission unit such as a gear train, or the two shafts can be substituted by one common shaft, it is satisfied as long as the two shafts are connected so as to transmit power therebetween.

FIG. 1 shows a schematic structural view of the hybrid power driving system according to one embodiment of the present invention.

As shown in FIG. 1, the engine 1 is connected with the first shaft A via the clutch 2. When the clutch 2 is engaged, the engine 1 may drive the first shaft A to rotate, and when the clutch 2 is disengaged, the power transmission between the engine 1 and the first shaft A is cut off. The motor 9 is connected with the second shaft B and electrically connected with the energy storage device 11. When the motor 9 receives electricity from the energy storage device 11, the second shaft B may be driven to rotate. In addition, the second shaft B may drive the motor 9 to generate electricity and store the generated electricity into the energy storage device 11. Numerical references 10 and 12 denote the know power converters.

The first shaft A has a first gear 3, a second gear 5 and a first synchronizer 4. The first gear 3 and the second gear 5 are fitted over and mounted on the first shaft A via bearings respectively, and the first synchronizer 4 is selectively engaged with the first gear 3 or the second gear 5. Here, the first synchronizer 4 may be a synchronizer used in a conventional transmission such as friction type inertial synchronizer generally used. The synchronizer generally comprises a splined hub fixed on the first shaft A, an engaging sleeve fitted over the hub and slidable on the hub axially, and a locking ring engaged with the gear frictionally. When the synchronizer is required to engage with the gear (for example the first gear 3), the engaging sleeve is shifted by using a shifting fork so as to engage the gear and locking ring, so that the gear and the splined hub are rotated together, thus realizing the power transmission between the gear and the first shaft A.

The second shaft B has a third gear 6, a fourth gear 8 and a second synchronizer 7. The third gear 6 is fitted over and mounted on the second shaft B via a bearing and rotatable relative to the second shaft B. The fourth gear 8 is fixed to the second shaft B so as to rotate synchronistically with the second shaft B. The second synchronizer 7 is selectively engaged with the third gear 6 or the fourth gear 8. The first gear 3 is engaged with the third gear 6, the second gear 5 is engaged with the fourth gear 8, and the third gear 6 is engaged with an output gear 14. The second synchronizer 7 has a same structure as that of the first synchronizer 4.

With the first to fourth gears, the first to third gears are fitted over and mounted on the first shaft or second shaft via bearings so as to rotate freely relative the first or second shaft, the fourth gear is fixed on the second shaft so as to rotate synchronistically with the second shaft B. The fourth gear may be mounted on the second shaft via interference fit or other suitable means, or may be integral with the second shaft, it is satisfied as long as the fourth gear can rotate synchronistically with the second shaft B.

It is known from the above that the first shaft A, the second shaft B, and the first to fourth gears and first and second synchronizers mounted thereon form a speed change mechanism having two gears similar to the conventional transmission. However, this speed change mechanism is different from the conventional transmission. Wit the conventional transmission, it is mainly used to shift the gear so as to adapt to different conditions of the vehicle, but in the embodiments of the invention, the speed change mechanism having two gears is mainly used to realize various drive modes and shift the hybrid power driving system among the various drive modes. More particularly, in the speed change mechanism having two gears of the present invention, by disposing the first to fourth gears on the first and second shafts in different manners (the first to third gear is rotatable relative to the first shaft or second shaft, and the fourth gear rotates synchronistically with the second shaft), and by using the first and second synchronizers 4, 7, it is easy to realize the various power matching of the different power sources, so that the hybrid power driving system has a plurality of drive modes and may be shifted among the plurality of drive modes by simply operating the first and second synchronizers 4, 7. In addition, the speed change mechanism having two gears may has the function of shifting between the high speed gear and the lower speed gear in some drive modes, so that the power source can operate effectively and be adaptable to different conditions. The operations of the speed change mechanism having two gears will be further described below.

In hybrid vehicles, the output gear 14 outputs the power from the engine 1 and/or motor 9 to the vehicles 16 via the differential 15 so as to drive the vehicle to run. In one embodiment, the energy storage device 11 may has an external charging port 13. In addition, the motor 9 can drive the vehicle separately to run in a cruising speed. During the valley time of electricity consumption, the energy storage device 11 may be charged by using the external charging port 13, so that the energy storage device 11 can supply electricity power to the motor 9 to drive the vehicle separately, and the use of the engine 1 is farthest reduced, thus saving energy and reducing environment pollution and bringing advantageous effects.

The transmission ratio of the first gear 3 and the third gear 6 may be determined based on the performance and parameters of the vehicle such as maximum speed, maximum climbable gradient, complete kerb mass, particularly, the ration is 1. The transmission ratio of the second gear 5 and the fourth gear 8 may be determined based on the performance and parameters of the vehicle such as maximum speed, maximum climbable gradient, complete kerb mass, particularly, the ration is 2.45. The transmission ratio of the third gear 6 and the output gear 14 may be determined based on the performance and parameters of the vehicle such as maximum speed, maximum climbable gradient, complete kerb mass, particularly, the ration is 4.9. Here, by selecting the ratio reasonably, the engine 1 and the motor 9 can operate at the optimal speed/power capability so as to increase the efficiency of the system.

Without particular or contradictory explication, aspects and features in the above embodiment are also applicable to the following embodiments. Therefore, the descriptions of the identical parts are omitted.

FIG. 2 is schematic structural view of the hybrid power driving system according to another embodiment of the present invention.

In the example shown in FIG. 1, the motor 9 is connected to the second shaft B directly, that is, the motor 9 and the second shaft B are disposed coaxially. Here, the output shaft of the mort and the second shaft B may be one shaft or two shafts connected via a coupler.

As shown in FIG. 2, the embodiment shown in FIG. 2 is different from the embodiment shown in FIG. 1 in that: the motor 9 is connected with the second shaft B via a transmission. The transmission may be any known transmission such as gear transmission, belt transmission, or chain transmission. As an example, the transmission comprises a first transmission gear 21 and a second transmission gear 22 engaged with each other, the motor 9 is connected with the first transmission gear 21, the first transmission gear 21 is mounted on the first shaft A via a bearing, and the second transmission gear 22 is fixed on the second shaft B. Therefore, the motor 9 and the second shaft B are connected via the first transmission gear 21 and the second transmission gear 22 engaged with each other. A suitable transmission ratio between the first transmission gear 21 and the second transmission gear 22 may be selected as desired so as to improve transmission efficiency.

The engine 1, the clutch 2, the first shaft A and the motor 9 are disposed coaxially, that is, the engine 1 and the motor 9 are disposed at two side of the driving system so as to optimize the arrangement of the system on the vehicle and balance the vehicle, and the structure is compact.

In addition, based on the type of the vehicle, besides being disposed coaxially with the first shaft A or the second shaft B, the motor 9 may be disposed in other manners, for example the motor 9 is disposed above or under the system, the present invention does not have any limits to the disposing of the motor.

In addition, as described above, the motor 9 is connected directly with the second shaft B, or connected to the second shaft B via a transmission. The motor 9 may be connected with the second shaft B via an addition clutch (not shown) so that the operation of the system is flexible and various.

Without particular or contradictory indicating, aspects and features in the above embodiments are also applicable to the following embodiments. Therefore, the descriptions of the identical parts are omitted.

Figure 3:
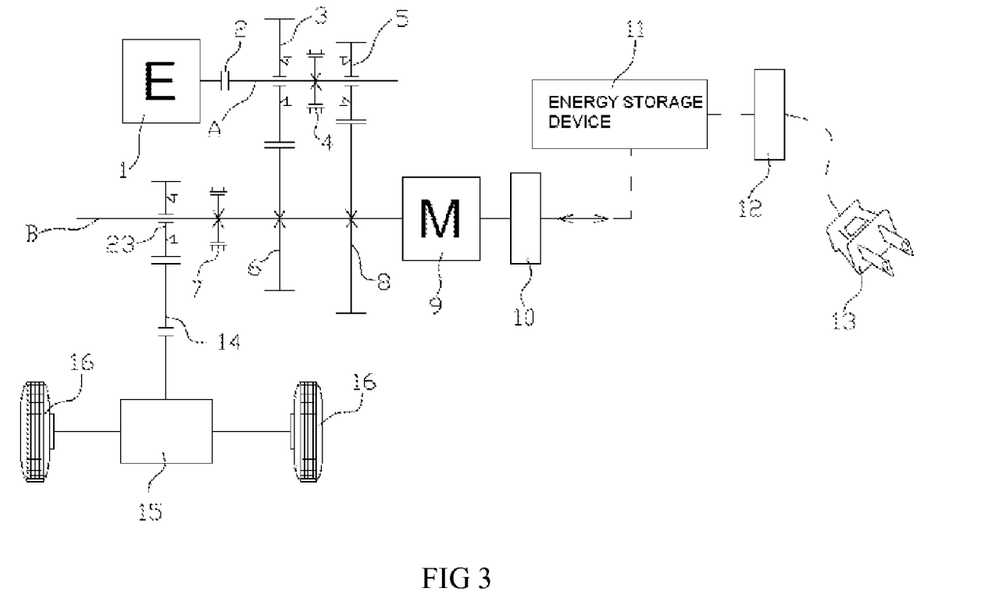
Figure 4:
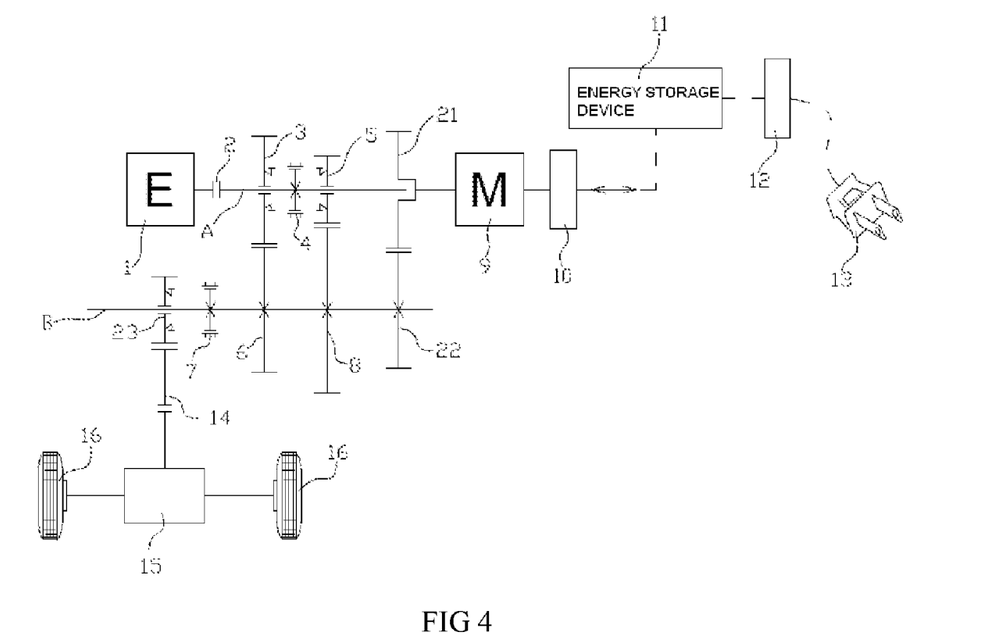

FIGS. 3 and 4 are schematic structural views of the hybrid power driving system according to another embodiment of the present invention.

As shown in FIGS. 3 and 4, a hybrid power driving system is provided, the hybrid power driving system comprises an engine 1, a clutch 2, a first shaft A, a second shaft B disposed parallel to the first shaft A, a motor 9, an energy storage device 11, and an output gear 14. The engine 1 is connected with the first shaft A via the clutch 2. The motor 9 is connected with the second shaft B directly or indirectly, and electrically connected with the energy storage device 11. The first shaft A has a first gear 3, a second gear 5 and a first synchronizer 4. The first gear 3 and the second gear 5 are fitted over and mounted on the first shaft A via bearings respectively, and the first synchronizer 4 is selectively engaged with the first gear 3 or the second gear 5. The second shaft B has a third gear 6, a fourth gear 8, a fifth gear 23 and a second synchronizer 7. The third gear 6 and the fourth gear 8 are fixed on the second shaft B, the fifth gear 23 is mounted on the second shaft B via a bearing, and the synchronizer 7 is selectively engaged with the fifth gear 23. The first gear 3 is engaged with the third gear 6, the second gear 5 is engaged with the fourth gear 8, and the fifth gear 23 is engaged with the output gear 14.

FIG. 3 is a schematic structural view of the hybrid power driving system according to an embodiment of the present invention, the structure of the embodiment shown in FIG. 3 is similar to that of the embodiment shown in FIG. 1 except for that the second shaft B is modified.

As shown in FIG. 3, the second shaft B has a third gear 6, a fourth gear 8, a fifth gear 23 and a second synchronizer 7. The third gear 6 and the fourth gear 8 are fixed on the second shaft B, the fifth gear 23 is mounted on the second shaft B via a bearing, and the synchronizer 7 is selectively engaged with the fifth gear 23. The first gear 3 is engaged with the third gear 6, the second gear 5 is engaged with the fourth gear 8, and the fifth gear 23 is engaged with the output gear 14 so as to output power via the output gear 14.

FIG. 4 is a schematic structural view of the hybrid power driving system according to another embodiment of the present invention, the structure of the embodiment shown in FIG. 4 is similar to that of the embodiment shown in FIG. 3 except for that the arrangement of the motor 9 is changed. Here, the arrangement of the motor 9 is substantially identical with that in FIG. 2.

FIGS. 5 to 10 are schematic views showing the hybrid power driving system according to embodiments in various operating modes.

As shown in FIGS. 5 to 10, a driving method of a hybrid power driving system is provided. The driving method comprises providing an engine 1, a clutch 2, a first shaft A, a second shaft B disposed parallel to the first shaft A, a motor 9, an energy storage device 11; and an output gear 14. The engine 1 is connected with the first shaft A via the clutch 2, when the clutch 2 is engaged, the engine 1 outputs power to the first shaft A. The motor 9 is connected with the second shaft B directly or indirectly, and is electrically connected with the energy storage device 11, such that the motor 9 outputs power to the second shaft B by receiving electricity from the energy storage device 11, or generates electricity and stores the electricity into the energy storage device 11 by receiving power from the second shaft B. The first shaft A has a first gear 3, a second gear 5 and a first synchronizer 4, in which the first gear 3 and the second gear 5 are fitted over and mounted on the first shaft A via bearings respectively, and the first synchronizer 4 is selectively engaged with the first gear 3 or the second gear 5. The second shaft B has a third gear 6, a fourth gear 8 and a second synchronizer 7, in which the third gear 6 is fitted over and mounted on the second shaft B via a bearing, the fourth gear 8 is fixed on the second shaft B, and the synchronizer 7 is selectively engaged with the third gear 6 or the fourth gear 8. The first gear 3 is engaged with the third gear 6, the second gear 5 is engaged with the fourth gear 8, and the third gear 6 is engaged with the output gear 14. The output gear 14 is used to output power from the engine 1 and/or the motor 9 to the wheels of the vehicle, or feed power from the wheels back to the motor 9, thus causing the motor 9 to generate electricity and store to the generated electricity into the energy storage device 11.

The motor 9 may be connected with the second shaft B directly so as to output power to the second shaft B or receive power from the second shaft B.

The motor 9 may be connected with the second shaft B via a transmission unit so as to output power to the second shaft B or receive power from the second shaft B.

The transmission unit may comprise a first transmission gear 21 and a second transmission gear 22 engaged with each other. The motor 9 is connected with the first transmission gear 21 mounted on the first shaft A via a bearing, and the second transmission gear is fixed on the second shaft B.

In an example, the engine 1, the clutch 2, the first shaft A and the motor 9 are disposed coaxially.

Figure 5:
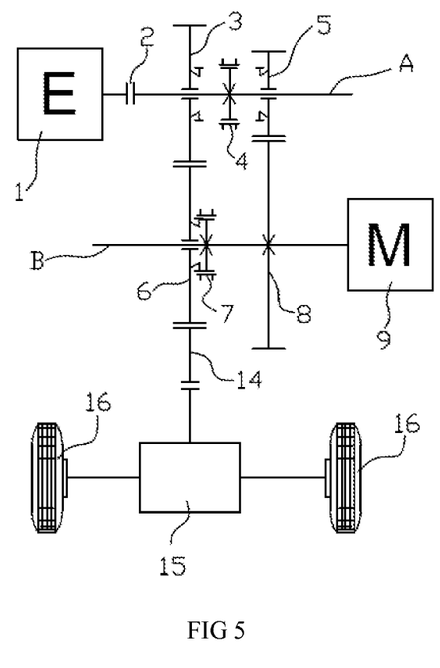
FIGS. 5 to 10 are schematic views showing the hybrid power driving system in various operating modes according to embodiments.

FIG. 5 shows the pure electric drive mode of the hybrid driving system. As shown in FIG. 5, the second synchronizer 7 engages with the fifth gear 23, the first synchronizer 4 may be positioned in the middle position thereof, i.e., a suspending position. At this time, the motor 9 operates as an electric motor driving the second shaft B to rotate. Because the second synchronizer 7 is engaged with the fifth gear 23, the second shaft B may drive the fifth gear 23 to rotate, and output the power to drive the vehicle via an output gear 14. At this time, because the first synchronize 4 is positioned in the middle position, the first gear 3 engaging with the third gear 6 and the second gear 5 engaging with the fourth gear 8 rotate idly on the first shaft A. In this driving mode, the engine 1 does not participate in driving and the vehicle is only driven by the motor 9 to run.

Under normal condition, i.e., when the energy storage device 11 has sufficient charge and the torque requirement of the vehicle is satisfied by the motor 9, the vehicle runs in the pure-electric drive mode. At this time, the direct start of the vehicle may be achieved. Also under this mode, reverse gear function may be achieved. The motor driver directly controls the motor 9 to rotate in reverse so that the vehicle may achieve reverse gear running. Thus, the reverse-gear mechanism and the reverse-gear manipulating mechanism may be omitted, so that the whole system is reduced by volume with simple structure. The weight thereof may be reduced, and the cost thereof may be lowered with enhanced reliability. In this mode, the gear-shift function of speed changing mechanism with two gears may not be used, and the rotating speed and torque of the motor 9 may be controlled by the motor driver so that the vehicle may be controlled.

Figure 6:
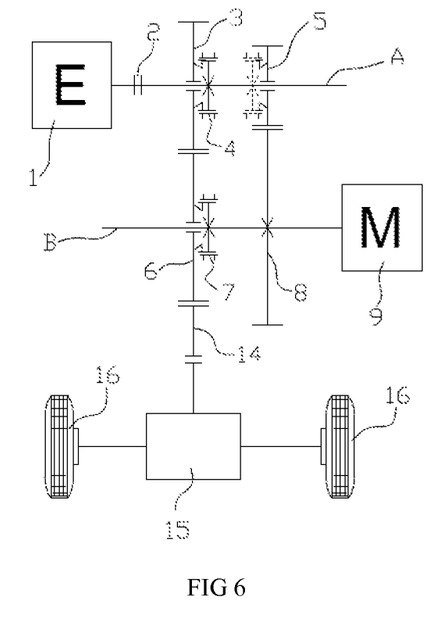

FIG. 6 shows a parallel mode of the hybrid driving system. As shown in FIG. 6, the first synchronizer 4 engages with the first gear 3 (as shown by solid line in the figure), or engages with the second gear 5 (as shown by dotted line) while the second synchronizer 4 still engages with the third gear 6. At this time, the motor 9 may drive the second shaft B to rotate while the clutch 2 is engaged, and the engine 1 may drive the first shaft A to rotate. When the first synchronizer 4 engages with the first gear 3 (low-speed gear state), the power of the engine 1 may drive the first gear 3 to rotate via the first shaft A. At this time, the power outputted from the engine 1 and power outputted from the motor 9 are overlapped on the second shaft B, and outputted via the output gear 14 so that the engine 1 and the motor 9 may drive in parallel. When the first synchronizer 4 engages with the second gear 5 (high-speed gear state), the power from the engine 1 may drive the second gear 5 to rotate via the first shaft A, at this time, power from the engine 1 may be transmitted to the third gear 6 via the second gear 5, the fourth gear 8 engaging the second gear 5 and the second shaft B rotating in synchronizing with the fourth gear 8, thus achieving the parallel driving of the engine 1 and the motor 9.

The parallel mode is suitable for vehicle rapid accelerating, climbing and overtaking under high speed etc. At this time, the torque requirement of the vehicle is larger than that provided by the motor. Therefore, the engine has to participate in operating so that the system may run in the parallel mode. Under this mode, the gear-shift function of the speed changing mechanism with two gears, i.e. the first synchronizer 4 being selectively engaging the first gear 3 or the second gear 5, may be used to adjust the rotating speed of the engine so that the engine and the motor may run in high efficiency.

Figure 7:
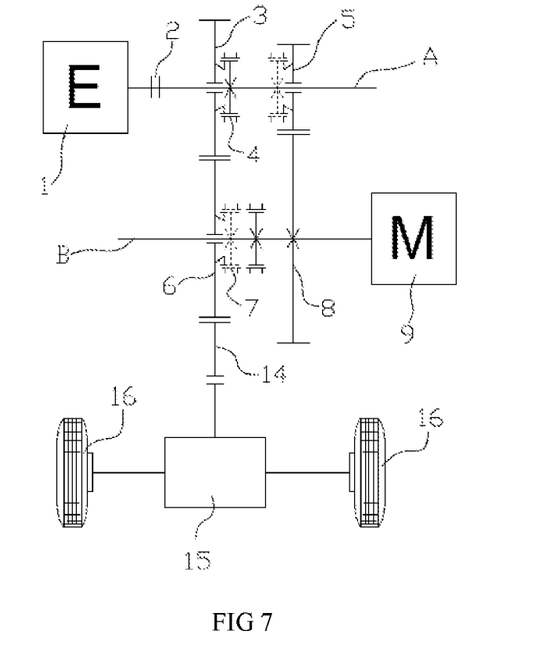

FIG. 7 shows the engine drive mode of the hybrid driving system. As shown in FIG. 7, there may be two-gear operating state under this engine drive mode, in which the low-speed gear state is indicated by solid lines, the first synchronizer 4 is engaged with the first gear 3 and the second synchronizer 7 is in the middle position, and in which the high-speed gear state is indicated by dotted lines, the first synchronizer 4 is engaged with the second gear 5 and the second synchronizer 7 is engaged with the third gear 6. Since the vehicle is driven by the engine 1 separately, the clutch 2 is engaged. Because the vehicle is only driven by the engine 1, the clutch 2 is in the engaging state. In the low-speed gear state, the engine 1 drives the first shaft A to rotate. The first shaft A may rotate the first gear 3 via the first synchronizer 4, the first gear 3 rotates the third gear 6, the third gear 6 may drive the output gear 14 to rotate to output power, and the motor 9 does not operate. In the high-speed gear state, the engine 1 drive the first shaft A to rotate, the first shaft A may drive the second gear 5 to rotate via the first synchronizer 4, the second gear 5 may drive the fourth gear 8 to rotate, the fourth gear 8 may drive the second shaft B to rotate, the second shaft B may drive the third gear 6 to rotate via the second synchronizer 7 so as to rotate output gear 14 to output power. At this time, the rotating shaft of the engine 9 runs idly.

Only the engine 1 supplies power in this mode which is adapted to the energy storage device 11 with insufficient charge or damaged. As stated above, this engine drive mode also has the low-speed and high-speed gear operating states, so that the rotating speed may be adjusted to make the engine running with high efficiency. In the low-speed operating state, the vehicle may be directly started.

Figure 8:
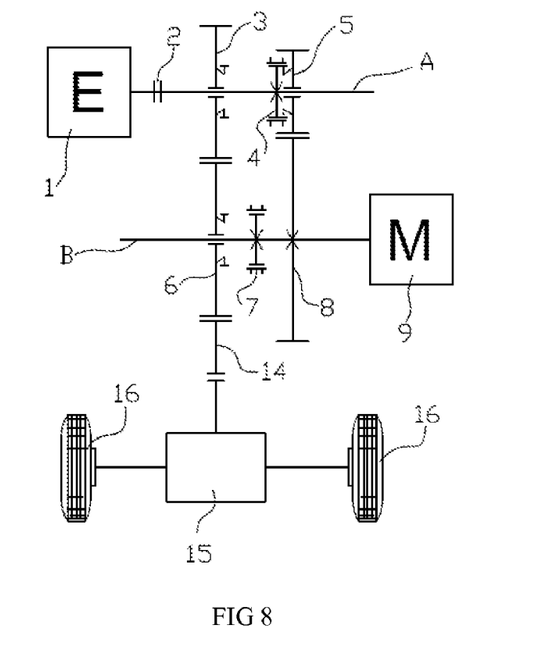

FIG. 8 shows the in-situ electricity generating mode of the hybrid driving system. As shown in FIG. 8, the clutch 2 is engaged, the first synchronizer 4 is engaged with the second gear 5, and the second synchronizer 7 is in the middle position. At this time, the engine 1 drives the first shaft A to rotate. The first shaft A may rotate the second gear 5 via the first synchronizer 4, the second gear 5 rotates the fourth gear 8, the fourth gear 8 drives the second shaft B to rotate so as to drive the motor 9 to generate electricity and to store the generated electricity into the energy storage device 11. Since the energy storage device 11 in the middle position, the third gear 6 does not rotate and no power is outputted.

When the charge of the energy storage device 11 is too low, this energy storage device 11 can be selected and used, that is, the engine 1 is started to generate electricity when the vehicle stops, so that the vehicle can run later. Under the general situation, the engine 1 is started by the starting motor (not shown). In the embodiment of the present invention, the engine 1 may be started by the motor. That is, the motor 9 may be started by a small amount of charge in the energy storage device 11, and the engine 1 is started by the motor 9, after the engine 1 is started, the motor 9 is driven by the engine 1 to generate electricity. The exhaust of the engine 1 can be reduced by starting the engine 1 by driving of the motor 9.

Figure 9:
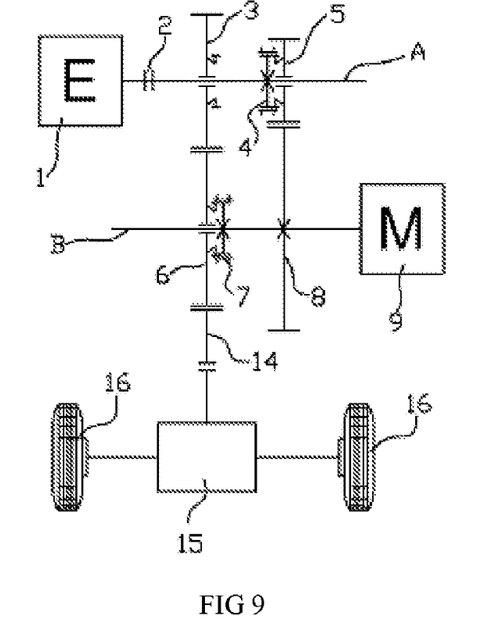

FIG. 9 shows the electricity generating and in-operating mode of the hybrid driving system. As shown in FIG. 9, the clutch 2 is engaged, the first synchronizer 4 is engaged with the second gear 5, and the second synchronizer 7 is engaged with the third gear 6. At this time, the engine 1 drives the first shaft A to rotate. The first shaft A may rotate the second gear 5 via the first synchronizer 4, the second gear 5 rotates the fourth gear 8, the fourth gear 8 drives the second shaft B to rotate, and the second shaft B drives the motor 9 to generate electricity while rotating the third gear 6 via the second synchronizer 7, that the power is outputted via the output gear 14. that is, in this electricity generating and in-operating mode, a portion of the power of the engine 1 is used to drive the motor 9 to generate electricity and the other portion of the power of the engine 1 is outputted via the output gear 14 to drive the vehicle to run. In addition, in this electricity generating and in-operating mode, the electricity generating load of the motor 9 may be driven by the motor driver so as to control the driving force of the vehicle, so that the engine 1 operates with high efficiency.

Figure 10:
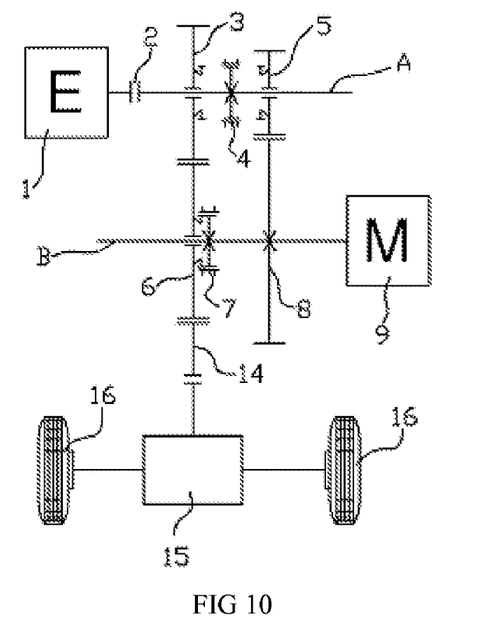

FIG. 10 shows the feedback electricity generating mode of the hybrid driving system. As shown in FIG. 10, the first synchronizer 4 is in the middle position, and the second synchronizer 7 is engaged with the third gear 6. The kinetic energy from the wheels of the vehicle drives the motor 9 to generate electricity via the output gear 14, the third gear 6, the second synchronizer 7 and the second shaft B so as to recover energy. In this feedback electricity generating mode, the braking of the vehicle may be realized by driving the motor 9. When the motor 9 is driven to generate electricity which is not enough for braking the vehicle, the braking ability may be further increased by engaging the clutch 2 to drive the engine 1 reversely. Of course, the vehicle may be braked by using the braking mechanism mounted on the vehicle.

In addition, since the energy storage device 11 has an external charging port 13, so that the starting system may have a mode in which the energy storage device 11 is charged by connecting to an external electrical source. That is, the energy storage device 11 is charged via the external charging port 13. In this mode, the energy storage device 11 is charged during valley time of electricity consumption such as night, therefore the commercial power supply can be used reasonably. Comparing to generating electricity by using oil engine, charging by using commercial power supply is low in cost, so that the cost of using vehicle is low and the environment pollution is reduced.

In the various drive mode of the driving system shown in FIGS. 5 to 10, the motor 9 is directly connected to the second shaft B. As described above, the motor 9 may be connected to the second shaft B via the first transmission gear 21 and the second transmission gear 22 engaged with other. The operation in this mode is similar to that in the above described modes, so that detailed description thereof is omitted.

Figure 11:
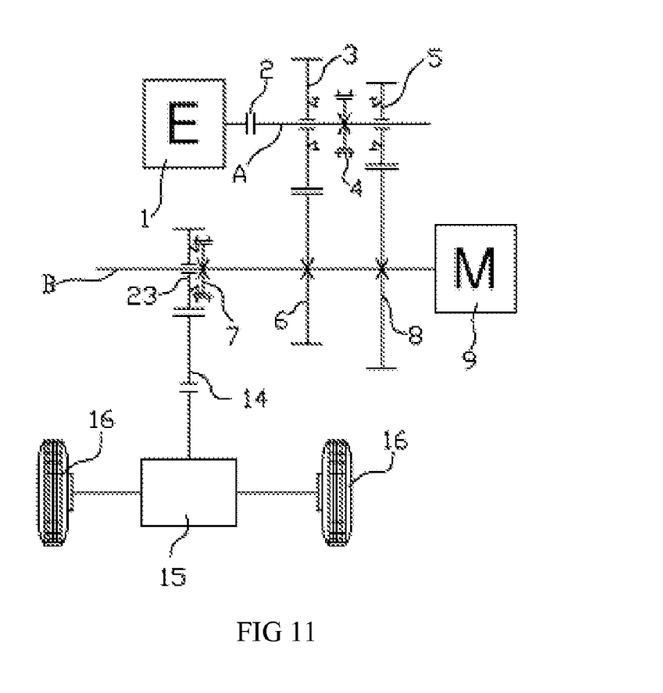
FIGS. 11 to 13 are schematic views showing the hybrid power driving system in various operating modes according to another embodiment.
Figure 12:
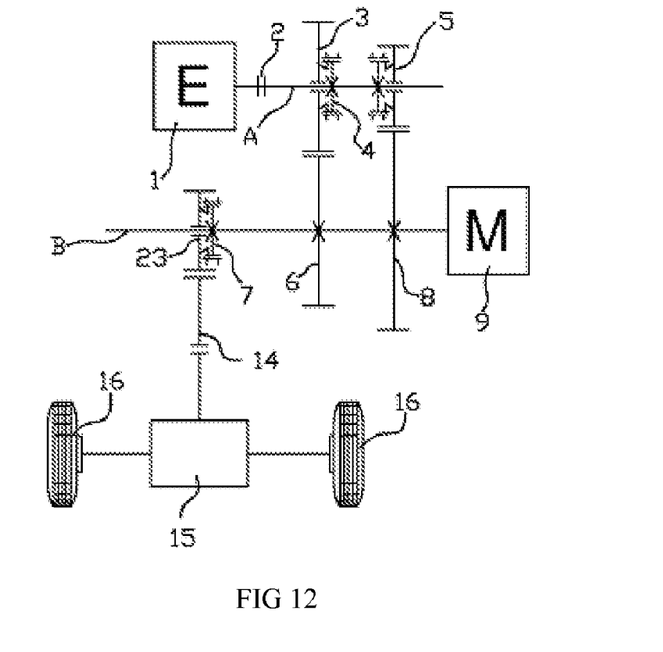
Figure 13:
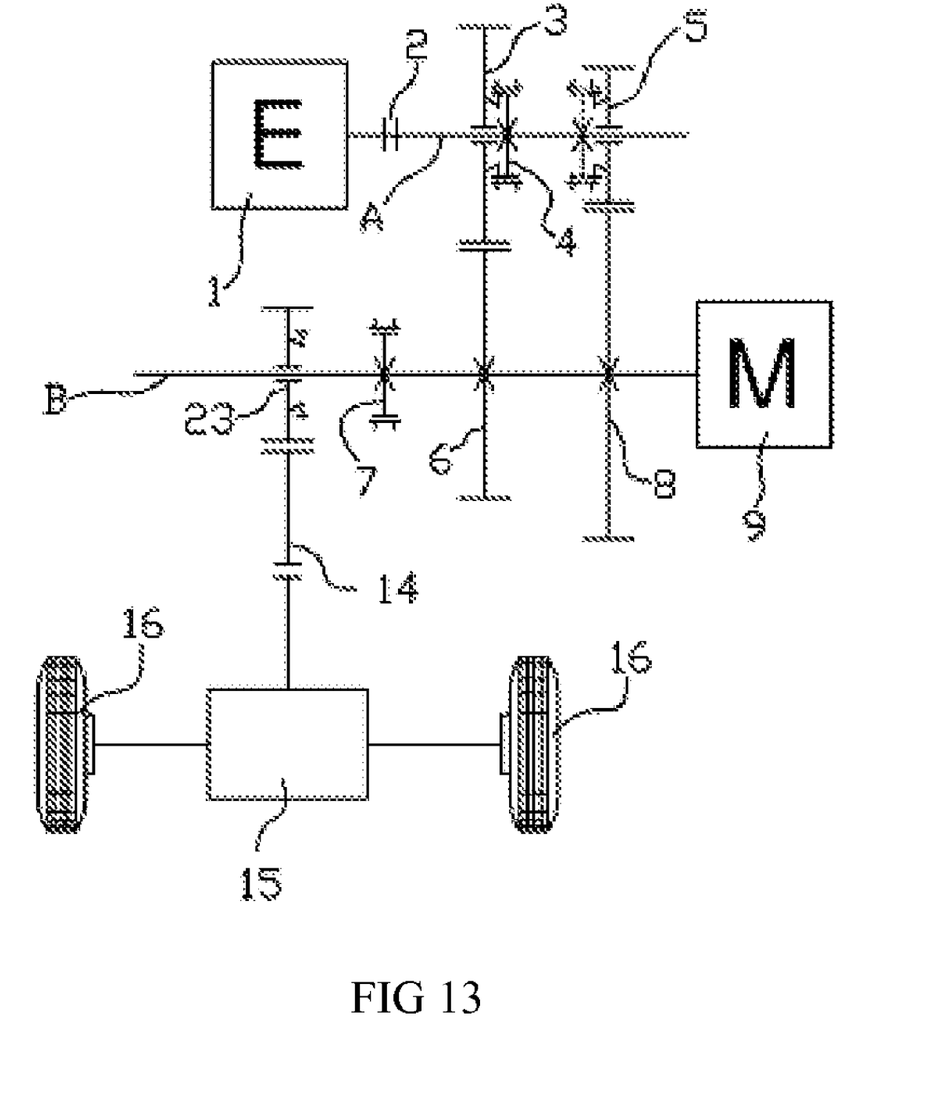

FIGS. 11-13 disclose schematic views of different operating modes of the hybrid power driving system according to another embodiment of the present invention.

As shown in FIGS. 11-13, a driving method of a hybrid power driving system may be provided. The driving method may comprise: providing an engine 1, a clutch 2, a first shaft A, a second shaft B disposed parallel to the first shaft A, a motor 9, an energy storage device 11; and an output gear 14. The engine 1 may be connected with the first shaft A via the clutch 2, when the clutch 2 may be engaged, the engine 1 outputs power to the first shaft A. The motor 9 may be connected with the second shaft B directly or indirectly and electrically connected with the energy storage device 11. The motor 9 may output power to the second shaft B by receiving electricity from the energy storage device 11. Or the motor 9 may generate electricity and store the electricity into the energy storage device 11 by receiving power from the second shaft B. The first shaft A may be provided with a first gear 3, a second gear 5 and a first synchronizer 4, in which the first gear 3 and the second gear 5 may be mounted on the first shaft A via a bearing, and the first synchronizer 4 may be selectively engaged with the first gear 3 or the second gear 5. The second shaft B may be provided with a third gear 6, a fourth gear 8, a fifth gear 23 and a second synchronizer 7, in which the third gear 6 and the fourth gear 8 are fixed to the second shaft B. The fifth gear 23 may be mounted on the second shaft B via a bearing, and the synchronizer 7 may be selectively engaged with the fifth gear 23. The first gear 3 may be engaged with the third gear 6, the second gear 5 may be engaged with the fourth gear 8, and the fifth gear 23 may be engaged with the output gear 14. The output gear 14 may be used to output the power from the engine 1 and/or the motor 9 to wheels, or feed the power from the wheels back to the motor 9, thus causing the motor 9 to generate electricity and store the electricity into the energy storage device 11.

The motor 9 may be connected with the second shaft B directly so as to output power to the second shaft B or receive power from the second shaft B.

The motor 9 may be connected with the second shaft B via a transmission unit so as to output power to the second shaft B or receive power from the second shaft B.

Preferably, the transmission unit may comprise: a first transmission gear 21; a second transmission gear 22 engaged with the first transmission gear 21. The motor 9 may be connected with the first transmission gear 21, the first transmission gear 21 may be mounted on the first shaft A via a bearing, and the second transmission gear 22 may be fixed on the second shaft B.

Preferably, the engine 1, the clutch 2, the first shaft A and the motor 9 may be disposed coaxially.

As shown in FIG. 11, the second synchronizer 7 engages with the fifth gear 23, the first synchronizer 4 may be positioned in the middle thereof, i.e., a suspending position.

At this time, the system is controlled in a pure-electric drive mode, the motor 9 can operate as an electric motor driving the second shaft B to rotate. Because the second synchronizer 7 may be engaged with the fifth gear 23, the second shaft B may drive the fifth gear 23 to rotate, and output the power to drive the vehicle via an output gear 14. At this time, because the first synchronize 4 is positioned in the middle position, the first gear 3 engaging with the third gear 6 and the second gear 5 engaging with the fourth gear 8 rotate idly on the first shaft A. In this driving mode, the engine 1 does not participate in driving, and the vehicle is driven by the motor 9 only.

Under normal condition, i.e., when the energy storage device 11 has sufficient charge and the torque requirement of the vehicle is satisfied by the motor 9, the vehicle runs in the pure-electric drive mode. At this time, the direct start of the vehicle may be achieved. Also under this mode, reverse gear function may be achieved. The motor driver directly controls the motor 9 to rotate in reverse so that the vehicle may achieve reverse gear running Thus, the reverse-gear mechanism and the reverse-gear manipulating mechanism may be omitted, so that the whole system is reduced by volume with simple structure. The weight thereof may be reduced, and the cost thereof may be lowered with enhanced reliability. In this mode, the gear-shift function of speed changing mechanism with two gears may not be used, and the rotating speed and torque of the motor 9 may be controlled by the motor driver so that the vehicle may be controlled.

In addition, the system may be controlled in a feedback electricity generating mode. The kinetic energy from the wheels drives the motor 9 to generate electricity via the output gear 14, the fifth gear 23, the second synchronizer 7 and the second shaft B, so that energy may be recycled. Through this operating mode, the vehicle brake may be achieved by the motor 9 being dragged. When the motor 9 is dragged to generate electricity which is not sufficient to brake the vehicle, the clutch 2 may be engaged to anti-drag the engine 1 to further enhance braking capability. Certainly, the braking device on the vehicle may be used for achieving the brake operation of the vehicle.

As shown in FIG. 12, the first synchronizer 4 engages with the first gear 3 (as shown by solid line in the figure), or engages with the second gear 5 (as shown by dotted line) while the second synchronizer 4 still engages with the fifth gear 23.

At this time, the system may be controlled to operate in a parallel mode. The motor 9 may drive the second shaft B to rotate while the clutch 2 is engaged and the engine 1 may drive the first shaft A to rotate. When the first synchronizer 4 engages with the first gear 3 (low-speed gear state), the power of the engine 1 may drive the first gear 3 to rotate via the first shaft A. At this time, the power outputted from the engine 1 and power outputted from the motor 9 are overlapped on the second shaft B, and outputted via the fifth gear 23 and the output gear 14 so that the engine 1 and the motor 9 may drive in parallel. When the first synchronizer 4 engages with the second gear 5 (high-speed gear state), the power from the engine 1 may drive the second gear 5 to rotate via the first shaft A, at this time, power from the engine 1 may be transmitted to the third gear 6 via the second gear 5, the fourth gear 8 engaging the second gear 5 and the second shaft B rotating in synchronizing with the fourth gear 8, thus achieving the parallel driving of the engine 1 and the motor 9.

The parallel mode is suitable for vehicle rapid accelerating, climbing and overtaking under high speed etc. At this time, the torque requirement of the vehicle is larger than that provided by the motor. Therefore, the engine has to participate so that the system may run in the parallel mode. Under this mode, the gear-shift function of the speed changing mechanism with two gears, i.e. the first synchronizer 4 being selectively engaging the first gear 3 or the second gear 5, may be used to adjust the rotating speed of the engine so that the engine and the motor may run in high efficiency.

Further, the system may be controlled to run in an engine drive mode. In the low-speed gear state, the engine 1 drives the first shift A to rotate. The first shaft A may rotate the first gear 3 via the first synchronizer 4, the first gear 3 rotates the third gear 6 and the second shaft B, the second shaft B may drive the fifth gear 23 and the output gear 14 to rotate via the second synchronizer 7 to output power, and the motor 9 does not operate, and the rotating shaft of the motor 9 may rotate idly. In the high-speed gear state, the engine 1 drive the first shaft A to rotate, the first shaft A may drive the second gear 5 to rotate via the first synchronizer 4, the second gear 5 may drive the fourth gear 8 to rotate, the fourth gear 8 may drive the second shaft B to rotate, the second shaft B may drive the fifth gear 23 to rotate via the second synchronizer 7 so that the output gear 14 may be rotated to output power. At this time, the rotating shaft of the engine 9 runs idly similarly.

Only the engine 1 supplies power in this mode which is adapted to the energy storage device 11 with insufficient charge or damaged. As stated above, this mode also has the low-speed and high-speed gear operating states, so that the rotating speed may be adjusted to make the engine running with high efficiency. In the low-speed operating state, the vehicle may be directly started.

In addition, the system may be controlled to run in an electricity generating and in-operating mode. The engine 1 may drive the first shaft A to rotate, the first shaft A may drive the second gear 5 to rotate via the first synchronizer 4, the second gear 5 may drive the fourth gear 8 to rotate, the fourth gear 8 may drive the second shaft B. While the second shaft B may drive the motor 9, the second synchronizer 7 may drive the fifth gear 23 to rotate so that power may be outputted by the output gear 14. That is to say, in this operating mode, a part of the power from the engine 1 may drive the motor 9 to generate electricity. Another part of the power is outputted via the output gear 14 to drive the vehicle. In addition, in this operating mode, the electricity generating load of the motor 9 may be controlled by the motor driver so that the driving force of the vehicle may be controlled, thus the engine may run with high efficiency.

As shown in FIG. 13, the clutch 2 engages, the first synchronizer 4 engages with the first gear 3 (as shown by solid line), or the first synchronizer 4 may engage with the second gear 5 (as shown by dotted line); the second synchronizer 7 may be positioned in the middle position.

At this time, the system may be controlled to run in the in-situ electricity generating mode. When the first synchronizer 4 is engaged with the first gear 3 (low-speed gear state), the power of the engine 1 may drive the first gear 3 and the third gear 6 to rotate via the first shaft A, the third gear 6 may drive the second shaft B to rotate so that the motor 9 is driven to generate electricity and the electricity is stored in the energy storage device 11. Because the second synchronizer 7 is provided in the middle position, the fifth gear 23 does not rotate, thus there is no power to be outputted. When the first synchronizer 4 engages with the second gear 5 (high-speed gear state), the power of the engine 1 drives the second gear 5 and the fourth gear 8 to rotate via the first shaft A, the forth gear 8 drives the second shaft B to rotate so that the motor 9 is driven to generate electricity, and the generated electricity is stored in the energy storage device 11. Because the second synchronizer 7 is positioned in the middle position, the fifth gear 23 does not rotate, thus no power is outputted. Under this mode, the rotating speed may be adjusted by the gear-shift function of the speed changing mechanism having two gears so that the engine may operate with highest efficiency, and the motor operates in the highest electricity generating zone.

When the charge of the energy storage device 11 is too low, this mode can be selected and used, that is, the engine 1 is started to generate electricity when the vehicle stops, so that the vehicle can run later. Under normal condition, the engine 1 is started by the starting motor (not shown). In the embodiment of the present invention, the engine 1 may be started by the motor 9. That is to say, the motor 9 may be started by a small amount of charge in the energy storage device 11, and the engine 1 is started by the motor 9, after the engine 1 is started, the motor 9 is driven by the engine 1 to generate electricity. The exhaust of the engine 1 can be reduced by starting the engine 1 by driving of the motor 9.

Further, as described above, because the energy storage device 11 of the present invention may further comprise an external charging port 13, the start system of the present disclosure may further comprise a charging by external power supply source mode. That is to say, the energy storage device 11 is charged by the external charging port 13. Through this mode, it is charged during low-electricity demanding period, such as at night or in deep night so that municipal electricity may be rationally used. In addition, the cost of charging with municipal electricity is much lower than that of motor using fuel. Thus, the cost for using the vehicle is lowered with reduced environmental pollution.

In the different operating modes of the driving system as shown in FIGS. 11-13, the motor 9 is directly coupled to the second shaft B. As described above, the motor 9 may also be coupled to the second shaft B via a transmission, such as the first transmitting gear 21 and the second transmitting gear 22 engaged with each other. The operating mode is similar to the modes as described herein, which will not be described in detail.

In all, The present invention at least possesses the following advantages:

1. A speed changing mechanism with two gears may substitute the traditional multispeed with the reverse gear mechanism being cancelled, thus saving some space which makes the system more compact, occupying less space.

2. The motor used in the present disclosure possess enough power which can drive the vehicle to run on a level road with medium or high speed, so that the vehicle may be driven by motor under normal condition which minimizes the usage of engine, thus saving energy and reducing environmental pollution.

3. By selecting appropriate transmission ratio among the gears, the engine and the motor may be operated under optimal rotating speed, thus effectively improving system efficiency.

4. The energy storage device may comprise an external charging port, which is designed to satisfy vehicle to run distance long enough with pure-electric drive mode, thus under normal usage, the engine may not be used in city driving such as during rush hour, shopping etc.

5. The present disclosure dexterously adopts a synchronizer in a traditional transmission to complete the conversion

What is claimed is:

1. A hybrid power driving system, comprising:
   an engine (1);
   a clutch (2);
   a first shaft (A);
   a second shaft (B) disposed parallel to the first shaft (A);
   a motor (9);
   an energy storage device (11); and
   an output gear (14); wherein
   the engine (1) is connected with the first shaft (A) via the clutch (2);
   the motor (9) is connected with the second shaft (B) directly or indirectly, and is electrically connected with the energy storage device (11);
   the first shaft (A) has a first gear (3), a second gear (5) and a first synchronizer (4), in which the first gear (3) and the second gear (5) are mounted on the first shaft (A) via bearings respectively, and the first synchronizer (4) is selectively engaged with the first gear (3) or the second gear (5);
   the second shaft (B) has a third gear (6), a fourth gear (8) and a second synchronizer (7), in which the third gear (6) is mounted on the second shaft (B) via a bearing, the fourth gear (8) is fixed to the second shaft (B), and the second synchronizer (7) is selectively engaged with the third gear (6) or the fourth gear (8);
   the first gear (3) is engaged with the third gear (6), the second gear (5) is engaged with the fourth gear (8), and the third gear (6) is engaged with an output gear (14).

2. The hybrid power driving system of claim 1, wherein the motor (9) is directly coupled to the second shaft (B).

3. The hybrid power driving system of claim 1, wherein the motor (9) is connected with the second shaft (B) via a transmission unit.

4. The hybrid power driving system of claim 3, wherein the transmission unit comprises:
   a first transmission gear (21);
   a second transmission gear (22) engaged with the first transmission gear (21);
   wherein the motor (9) is connected with the first transmission gear (21), the first transmission gear (21) is mounted on the first shaft (A) via a bearing, and the second transmission gear is fixed on the second shaft (B).

5. The hybrid power driving system of claim 4, wherein the engine (1), the clutch (2), the first shaft (A) and the motor (9) are disposed coaxially.

6. The hybrid power driving system of claim 1, wherein the output gear (14) outputs power to wheel (16) via a differential (15).

7. The hybrid power driving system of claim 1, wherein the energy storage device has an external charging port.

8. The hybrid power driving system of claim 1, wherein the motor (9) may drive the vehicle separately to run in a cruising speed.

9. The hybrid power driving system of claim 1, wherein a transmission ratio of the first gear (3) and the third gear (6) is 1, a transmission ratio of the second gear (5) and the fourth gear (8) is 2.45, and a transmission ratio of the third gear (6) and the output gear (14) is 4.9.

10. A driving method of a hybrid power driving system, comprising:
    providing an engine (1), a clutch (2), a first shaft (A), a second shaft (B) disposed parallel to the first shaft (A), a motor (9), an energy storage device (11); and an output gear (14);
    wherein, the engine (1) is connected with the first shaft (A) via the clutch (2), when the clutch (2) is engaged, the engine (1) outputs power to the first shaft (A);
    the motor (9) is connected with the second shaft (B) directly or indirectly, and is electrically connected with the energy storage device (11), such that the motor (9) outputs power to the second shaft (B) by receiving electricity from the energy storage device (11), or the motor (9) generates electricity and stores the electricity into the energy storage device (11) by receiving power from the second shaft (B);
    the first shaft (A) is provided with a first gear (3), a second gear (5) and a first synchronizer (4), in which the first gear (3) and the second gear (5) are mounted on the first shaft (A) via bearings respectively, and the first synchronizer (4) is selectively engaged with the first gear (3) or the second gear (5);
    the second shaft (B) is provided with a third gear (6), a fourth gear (8) and a second synchronizer (7), in which the third gear (6) is mounted on the second shaft (B) via a bearing, the fourth gear (8) is fixed on the second shaft (B), and the synchronizer (7) is selectively engaged with the third gear (6) or the fourth gear (8);
    the first gear (3) is engaged with the third gear (6), the second gear (5) is engaged with the fourth gear (8), and the third gear (6) is engaged with the output gear (14);
    the output gear (14) is used to output power from the engine (1) and/or the motor (9) to wheels, or feed power from the wheels back to the motor (9), thus causing the motor (9) to generate electricity and store to the generated electricity into the energy storage device (11).

11. The driving method of claim 10, wherein the motor (9) is connected with the second shaft (B) directly so as to output power to the second shaft (B) or receive power from the second shaft (B).

12. The driving method of claim 10, wherein the motor (9) is connected with the second shaft (B) via a transmission unit so as to output power to the second shaft (B) or receive power from the second shaft (B).

13. The driving method of claim 12, wherein the transmission unit comprises:
    a first transmission gear (21);
    a second transmission gear (22) engaged with the first transmission gear (21);
    wherein the motor (9) is connected with the first transmission gear (21), the first transmission gear (21) is mounted on the first shaft (A) via a bearing, and the second transmission gear is fixed on the second shaft (B).

14. The driving method of claim 13, wherein the engine (1), the clutch (2), the first shaft (A) and the motor (9) are disposed coaxially.

15. The driving method of claim 10, wherein the driving system comprises the following operating modes:
    a pure electric drive mode, in which the vehicle is driven by the motor (9) separately, the engine (1) is stopped, the clutch (2) is disengaged, the first synchronizer (4) is in a middle position, and the second synchronizer (7) is engaged with the third gear (6);
    a parallel mode, in which the vehicle is driven by the engine (1) and the motor (9) jointly, the clutch is engaged, the first synchronizer (4) is engaged with the first gear (3) or the second gear (5), and the second synchronizer (7) is engaged with the third gear (6);

an electricity generating and in-operating mode, in which the vehicle is driven by the engine (1) and the motor (9) is simultaneously driven to generate electricity, the clutch (2) is engaged, the first synchronizer (4) is engaged with the first gear (3) or the second gear (5), and the second synchronizer (7) is engaged with the third gear (6); and an engine drive mode, in which the vehicle is driven by the engine (1) separately, the clutch (2) is engaged, the first synchronizer (4) is engaged with the first gear (3) and the second synchronizer (7) is in a middle position, or the first synchronizer (4) is engaged with the second gear (5) and the second synchronizer (7) is engaged with the third gear (6).

16. The driving method of claim 15, wherein the driving system further comprises the following operating modes:

an in-situ electricity generating mode, in which the engine (1) drives the motor (9) to generate electricity, the clutch (2) is engaged, the first synchronizer (4) is engaged with the second gear (5), and the second synchronizer (7) is in a middle position; and a feedback electricity generating mode, in which the output gear (14) outputs power to drive the motor (9) to generate electricity, the engine (1) is stopped, the synchronizer (4) is in a middle position, and the second synchronizer (7) is engaged with the third gear (6).

17. The driving method of claim 15 or 16, the driving system further comprises the following operating mode:

a charging by external power supply source mode, in which the energy storage device (11) is charged by an external charging port (13).

* * * * *